US009086096B2

(12) United States Patent
Long et al.

(10) Patent No.: US 9,086,096 B2
(45) Date of Patent: Jul. 21, 2015

(54) TORQUE LIMITER WITH IMPROVED LUBRICATION

(71) Applicants: Randall R. Long, Wichita Falls, TX (US); Ryan Jesse, Nashville, TN (US); Mark Rudolph, Wichita Falls, TX (US); Shane Johnson, Wichita Falls, TX (US); Thomas Ross, Iowa Park, TX (US)

(72) Inventors: Randall R. Long, Wichita Falls, TX (US); Ryan Jesse, Nashville, TN (US); Mark Rudolph, Wichita Falls, TX (US); Shane Johnson, Wichita Falls, TX (US); Thomas Ross, Iowa Park, TX (US)

(73) Assignee: Brunel Corporation, Wichita, TX (US)

( * ) Notice: Subject to any disclaimer, the term of this patent is extended or adjusted under 35 U.S.C. 154(b) by 0 days.

(21) Appl. No.: 13/938,516

(22) Filed: Jul. 10, 2013

(65) Prior Publication Data

US 2014/0309040 A1 Oct. 16, 2014

Related U.S. Application Data

(60) Provisional application No. 61/810,855, filed on Apr. 11, 2013.

(51) Int. Cl.
*F16D 7/06* (2006.01)
*F16D 7/10* (2006.01)

(52) U.S. Cl.
CPC .............. *F16D 7/10* (2013.01); *F16D 2300/06* (2013.01)

(58) Field of Classification Search
USPC .............. 464/10, 35, 37, 15; 192/56.1, 56.51, 192/56.54, 56.57, 56.62; 384/475
See application file for complete search history.

(56) References Cited

U.S. PATENT DOCUMENTS 3,195,965 A * 7/1965 Van Dorn ....................... 384/475
3,985,213 A * 10/1976 Braggins .................... 192/56.57
8,162,246 B2 * 4/2012 Long et al.

FOREIGN PATENT DOCUMENTS

DE           35 19 686 A1 *  2/1986  ................... 384/475

* cited by examiner

*Primary Examiner* — Gregory Binda
(74) *Attorney, Agent, or Firm* — John R. Benefiel

(57) ABSTRACT

A torque limiter in which grease passages are provided to enable better lubrication of the wearing components. A disconnect nut is also provided to readily enable release of the torque limiter even for very high release settings to afford greasing as a part of a maintenance regimen.

4 Claims, 3 Drawing Sheets

TORQUE LIMITER WITH IMPROVED LUBRICATION

CROSS REFERENCE TO RELATED APPLICATIONS

This application claims the benefit of U.S. provisional application No. 61/810,855 filed on Apr. 11, 2013.

BACKGROUND OF THE INVENTION

This invention concerns torque limiters which are well known devices which act to produce an overload release in a rotary drive train when the torque transmitted exceeds a predetermined level, in order to prevent damage to components in the drive train.

Resettable torque limiters are also well known in which drive balls are installed in detent pockets and held therein by a plunger urged against the drive ball by spring pressure. When a predetermined maximum torque is reached, the drive ball can force the plunger away and allow the drive ball to climb out of the pocket allowing relative rotation of two interfit parts to interrupt the driving connection therebetween.

In conventional practice, grease is applied to the wearing components by injection into a passage drilled through the plunger to the drive ball engaged with the plunger end, and passages extending radially out past a bushing to reach various wear components.

However, in prior designs grease does not flow past the drive ball to the detent pocket without release of the torque limiter since the drive ball normally blocks the grease flow until the torque limiter releases. Grease flow past the bushing is limited due to the limited clearance.

For high torque release settings, it is difficult to manually trip the limiter for routine maintenance purposes.

In such torque limiters there are sometimes also heavily preloaded bearings supporting one interfit part on the other. Normally these parts do not relatively rotate, but both parts rotate together since connected together by the torque limiter drive ball, and these bearings become dry as the grease migrates out over time due to centrifugal force generated by rotation together of the interfit parts. Due to their location, these bearings are not able to be greased, except when the torque limiter is released.

It is an object of the present invention to provide improved lubrication for a resettable torque limiter of the type described above by providing enhanced distribution of grease to the wearing components.

SUMMARY OF THE INVENTION

The above object and other objects which will become apparent upon a reading of the following specification and claims are achieved by forming lubricant passages in the plunger and bushing that allow free flow of lubricant to points which will adequately lubricate the moving components in a drive device such as a torque limiter. This includes a central passage extending lengthwise down the plunger which terminates short of the end in contact with the drive ball, which central passage is connected to a cross passages extending radially to short offset longitudinal passages, which distribute lubricant to an open annular space extending around the drive ball, as well as laterally to a clearance between the plunger and the ID of a bore in a bushing in which the plunger is slidably fit. Lubricant from the open spaces further enters cross passages in the bushing which extends to the bushing bore ID as well as lengthwise passages through the bushing to reach the lower regions and the detent pocket.

In addition, a disconnect nut threadably engages the upper end of a plunger shroud secured to the plunger upper end and when rotated with a wrench causes raising of the plunger to manually elevate the plunger sufficiently to release the torque limiter by driving the locking balls radially outward.

The torque limiter release enables the lubrication of bearings supporting the interfit drive parts which are included in the torque limiter, which normally cannot be greased when the torque limiter is not in a released condition. Improved lubrication of the torque limiter running parts is also facilitated.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
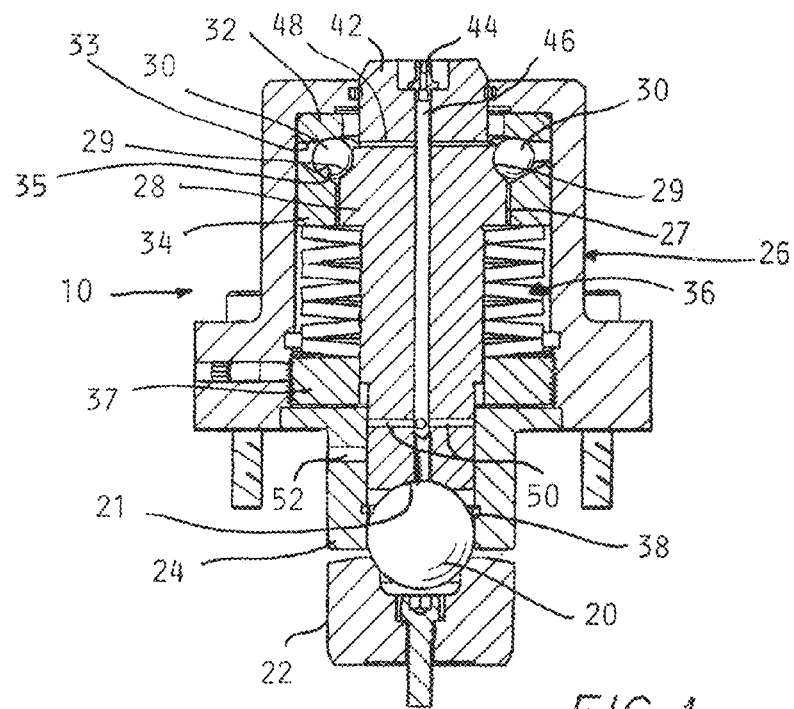
FIG. 1 is a sectional view of a prior art torque limiter of a type with which the present invention is concerned showing a conventional grease passage pattern.
Figure 2:
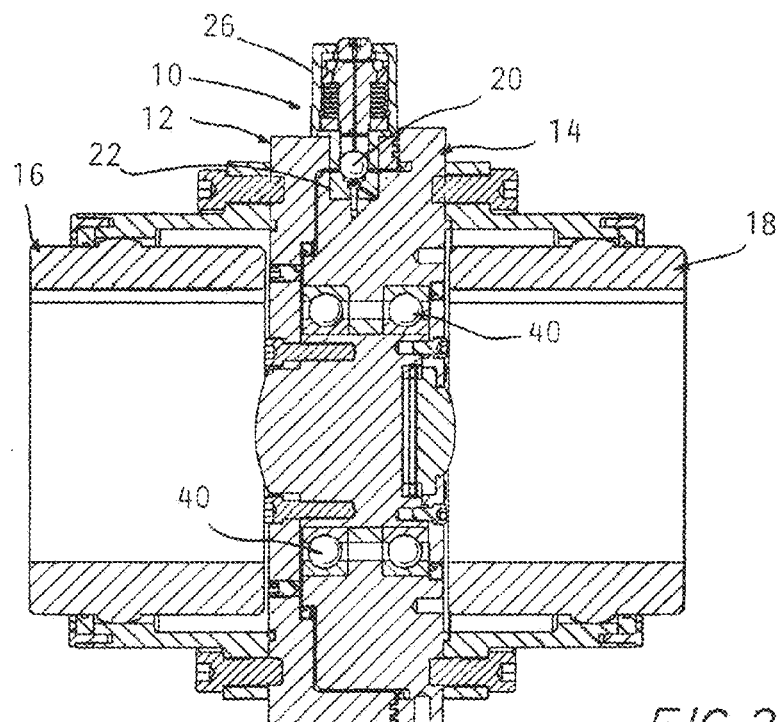
FIG. 2 is a view of prior art driving and driven interfit parts combined with a conventional torque limiter to create a driving connection therebetween.

Referring to FIGS. 1 and 2, a prior art torque limiter 10 of the type which the present invention is concerned is shown. One or more of such torque limiters may be installed circumferentially spaced about the axis of a pair of interfit rotary parts 12 and 14 other arrangements of such torque limiters are well known.

One interfit rotary part 12 is secured to a drive (or driven) member 16 and the other rotary part 14 is secured to a driven (or drive) member 18.

A drive ball 20 is normally seated within a detent pocket 22 fixed in rotary member 14 and a bushing 24 fixed within a housing 26 is secured to rotary member 12. The drive ball 20 creates a rotational connection so that the rotary members 12 and 14 normally rotate together.

Upon the development of a transmitted torque of a predetermined level, the drive ball 20 begins to ride up the sloping sides of the detent pocket 22 and to thereby push up a plunger 28 which has radiused pocket 21 (FIG. 1) at its lower end in contact with the drive ball 20. When there is a torque lower than the predetermined level, plunger 28 is urged downwardly by the effect of a stiff spring 36 engaging the underside of the thrust ring 34 and urging it upwardly. The sloping surface 35 acts on balls 30 to force them inwardly against a shoulder 29 on the upper end of the plunger 28, urging the plunger 28 down and into engagement with drive ball 30.

The spring 36 exerts axial pressure on lower thrust race 34 to urge the locking 30 radially inward to resist outward movement of the small locking balls 30 which are urged radially outwardly by engagement therewith of a rounded shoulder surface 29 on the upper end of the plunger 28, the drive ball 20 urging the plunger 28 upwardly when the drive ball 20 is transmitting a torque.

Any axial movement of the plunger 28 is resisted by the constraining effect resisting radially outward movement of the balls 30 exerted by upper thrust race 32 and the lower thrust race 34 being urged together by the preloaded spring 36 applying an axial force to lower thrust race 34 with the sloping surfaces 33, 35 urging the balls 30 radially inward and countering the outward force exerted by the plunger surface 29 when the drive ball 20 urges the plunger 28 upwardly. An adjusting nut 37 allows setting of the spring preload.

If the transmitted torque level reaches a predetermined release value, the spring force described is overcome to allow the locking balls 30 to be moved radially out by the engagement of the plunger shoulder 29 driven up by the drive ball 20 moving the lower race 34 down and thereby allowing the locking balls 30 to move out radially sufficiently to move onto the outer diameter 27 of the plunger 28. This allows the plunger 28 to move up axially sufficiently to allow the drive ball 20 to move out of the pocket 22 and interrupt the driving connection.

At this point, the drive ball 20 has moved up into the interior bore of the bushing. A snap ring 38 then holds the ball 20 up and out of engagement with the detent pocket 22, allowing interfit parts 12, 14 to freely rotate, relative each other, supported by rotary bearings 40 (FIG. 2).

The torque limiter 10 can be reset by striking the upper end 42 of the plunger 28 with sufficient force in the well know manner.

In order to keep grease on the torque limiter rotating wear parts, a grease fitting 44 is normally provided which allows injection of grease into an axial central passage 46 in the plunger 28 which passes down to the top of the drive ball 20 which normally prevents any further grease flow.

Two (or more) pairs of cross passages 48 and 50 branch off from the central plunger passage 46. The upper pair of passages lubricate the races 32, 34 and locking balls 30. The lower pair of feed cross passages 50 reach the bottom of the bushing and theoretically reach the detent pocket 22 and drive ball 20 via a clearance and small grooves. However, little or no grease will reach the lower components as a practical matter due to the slight clearances.

Grease will only exit the lower end of the passage 46 when the torque limiter 10 has been released by movement of the plunger 28.

Additionally, the bearings 40 can only effectively be greased during routine maintenance when the torque limiter is tripped. This is almost impossible to do manually due to very high torque limit settings often used in some applications. Since the bearings 40 are typically heavily preloaded and do not rotate while the torque limiter remains locked, heavy wear can result as the grease over time tends to migrate out due to rotation of the assembly and consequently the bearings 40 become dry.

Figure 3:
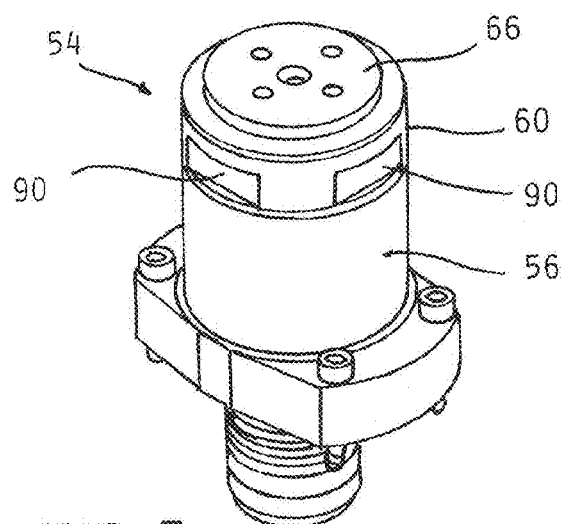
FIG. 3 is an external pictorial view of a torque limiter according to the present invention.
Figure 4:
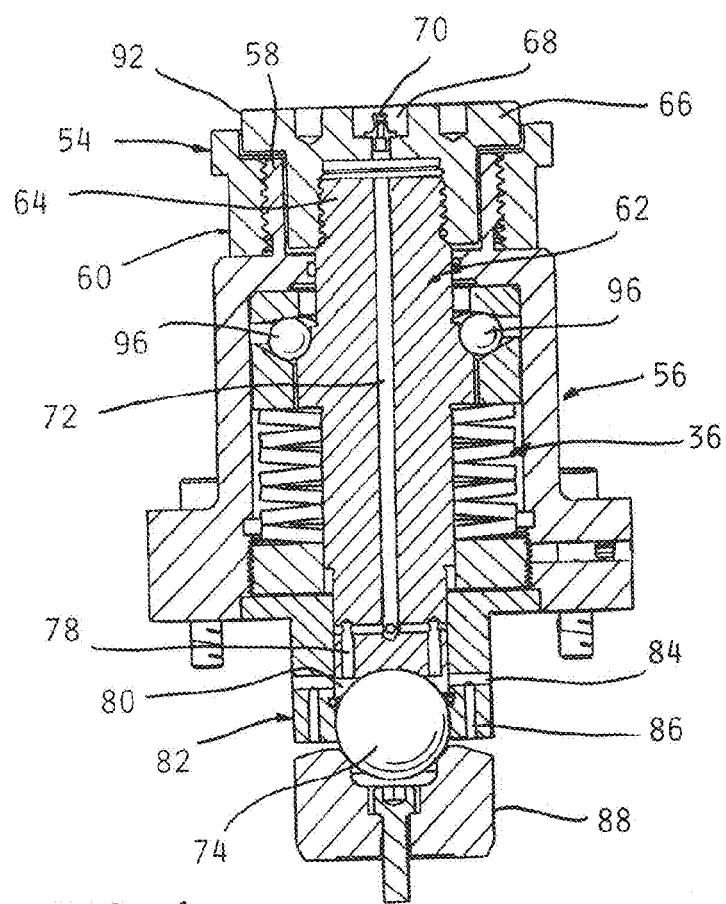
FIG. 4 is an enlarged sectional view of the torque limiter according to the present invention shown in FIG. 3.
Figure 5:
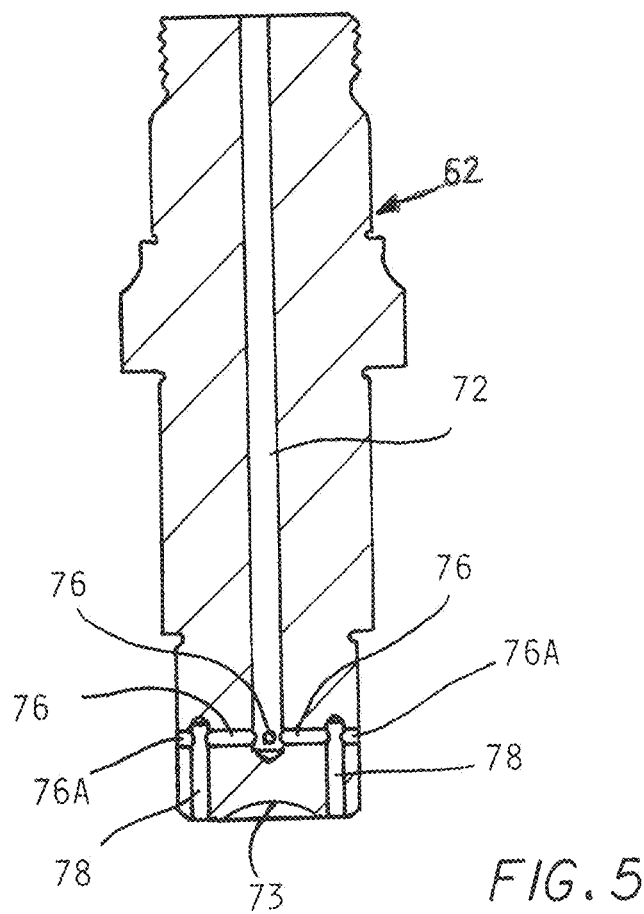
FIG. 5 is an enlarged sectional view of a plunger included in the torque limiter shown in FIGS. 3 and 4.

Referring to FIGS. 3 and 4, a torque limiter 54 according to the invention is shown which has the same basic driving parts as the prior art torque limiter described above. However, the torque limiter 54 has a housing 56 which has a threaded extension 58 which receives a disconnect nut 60 which engages a plunger shroud 66 threaded to the upper end 64 of the plunger 62.

A recess 68 in the plunger shroud 66 receives a grease fitting 70.

An axial central lengthwise grease passage 72 is provided in the plunger 62, which terminates short of the radiused pocket 73 and the drive ball 74. Instead, there are two cross passages 76 which connect with two pairs of offset longitudinal passages 78 that extend to an annular clearance space 80 adjacent the drive ball 74.

Figure 6:
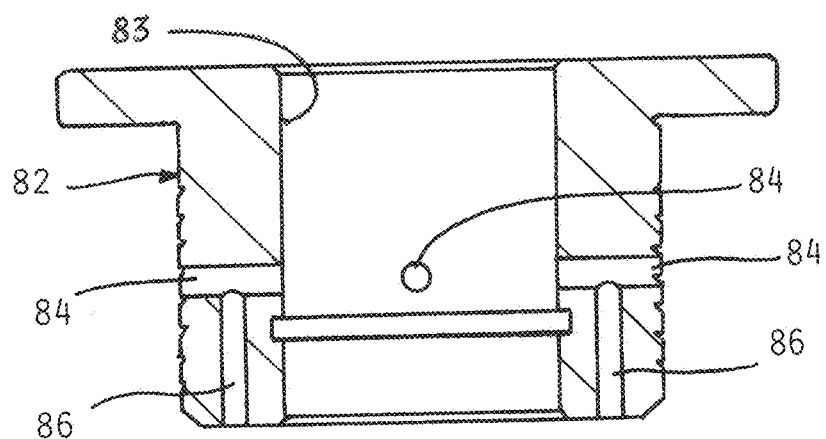
FIG. 6 is an enlarged sectional view of a bushing included in a torque limiter according to the invention shown in FIGS. 3 and 4.

The brushing 81 has a bore 83 (FIG. 6) which slidably receives the lower end of the plunger 62 has two cross passages 84, each receiving grease from the annular space 80 and direct the grease into the same out through down passages 86 through the bushing 82 so that grease can reach the detent pocket 88.

The cross passages 76 have ends 76A which extend to the inside diameter of the bushing 82 to provide additional grease flow.

Thus, the set of grease passages described are able to effectively direct grease to the wearing components without releasing the torque limiter.

A second aspect of the invention involves the disconnect nut 60 and plunger shroud 66. The disconnect nut 60 has a series of wrenching flats 90 (FIG. 3) thereon so that a wrench (not shown) can be used to turn the same on the external threads on the housing extension 58 and thereby advance the disconnect nut 60 up as viewed in FIG. 4.

The powerful mechanical advantage exerted by of the threaded engagement of the disconnect nut 60 enables the balls 96 to be forced out until the torque limiter 54 becomes disconnected, even if the torque release level is set to be very high.

Once released, the bearings 40 can be rotated and greased as a part of a regular maintenance regime. In addition, flow of grease to the torque limiter wear components as described above is enhanced.

The invention claimed is:

1. A drive device comprising:
   a housing mounted to a first drive member;
   a plunger slidable in said housing;
   a bushing within said housing having a bore slidably receiving a lower end of said plunger;
   a drive ball disposed in a seat in a detent pocket mounted to a second drive member and contacted by a lower end surface of said plunger, said seat being configured to establish a driving connection between said first and second members but allow said drive ball to move radially out and up from said pocket upon transmission of a release torque level above a predetermined level;
   an upper thrust race;
   a lower thrust race;
   a plurality of locking balls interposed and engaged between a sloping surface on a lower side of said upper thrust race and an upper side of said lower thrust race;
   a shoulder on said plunger engaging a portion of said locking balls protruding from between said thrust race surfaces to normally prevent said plunger from moving axially away from said drive ball;
   a spring acting on said lower thrust race to urge said locking balls radially inwardly and maintain said plunger in engagement with said drive ball as long as torque transmitted cannot overcome said spring force but upon transmission of said predetermined release value torque said shoulder on said plunger forces said locking balls radially out by moving said lower thrust race down against said spring force to free said plunger to move axially past said locking balls and allowing said drive ball to move out of said pocket;

a central longitudinal grease passage extending through the length of said plunger, but ending before said end surface of said plunger said grease passage continuing in a cross passage to either side of said central passage and further including a pair of short longitudinal passages each extending from a respective side of said cross passage whereby grease may be injected into a space extending around said drive ball.

2. The drive device according to claim 1 further including a plurality of cross passages extending radially out from said bushing bore at locations aligned with said space below said end of said plunger and extending about the perimeter of said drive ball; and a longitudinal passage extending from each of said radial cross passages in said bushing to enable a flow of grease past said drive ball to said detent pocket.

3. The drive device according to claim 1 further including a tubular extension projecting from an end of said housing opposite said bushing and threaded on the outside; a disconnect nut threaded onto said tubular extension to be enabled to be advanced in a direction away from said bushing upon being rotated in one direction;

a plunger shroud secured to said plunger end opposite said bushing and having a portion engaged by said disconnect nut upon movement thereof in a direction away from said bushing whereby said plunger can be retracted to force said locking balls radially out and thereby disconnect said torque limiter.

4. A torque limiter comprising:
   a housing mounted to a first drive member;
   a plunger slidable in said housing;
   a bushing within said housing having a bore slidably receiving a lower end of said plunger;
   a drive ball disposed in a seat in a detent pocket mounted to a second drive member and contacted by a lower end surface of said plunger, said seat being configured to establish a driving connection between said first and second members but allow said drive ball to move radially out and up from said pocket upon transmission of a release torque level above a predetermined level;
   an upper thrust race;
   a lower thrust race;
   a plurality of locking balls interposed and engaged between a sloping surface on a lower side of said upper thrust race and an upper side of said lower thrust race;
   a shoulder on said plunger engaging a portion of said locking balls protruding from between said thrust race surfaces to normally prevent said plunger from moving axially away from said drive ball;
   a spring acting on said lower thrust race to urge said locking balls radially inwardly and maintain said plunger in engagement with said drive ball as long as torque transmitted cannot overcome said spring force but upon transmission of said predetermined release value torque shoulder on said plunger forces said locking balls radially out by moving said lower thrust race down against said spring force to free said plunger to move axially past said locking balls and allowing said drive ball to move out of said pocket;
   a tubular extension projecting from an end of said housing opposite said bushing and threaded on the outside; a disconnect nut threaded onto said tubular extension to be enabled to be advanced in a direction away from said bushing upon being rotated in one direction;
   a plunger shroud secured to said plunger end opposite said bushing and having a portion engaged by said disconnect nut upon movement thereof in a direction away from said bushing whereby said plunger can be retracted to force said locking balls radially out and thereby disconnect said torque limiter;
   a central longitudinal grease passage extending through the length of said plunger, but ending before said end surface of said plunger said grease passage continuing in a plurality of cross passages to either side of said central passage and further including short longitudinal passages each extending from a respective side of each of said cross passages whereby grease may be injected to an annular space extending around said drive ball.

\* \* \* \* \*